(12) United States Patent
Manuel et al.

(10) Patent No.: US 6,806,891 B1
(45) Date of Patent: Oct. 19, 2004

(54) METHOD AND APPARATUS FOR AUTOMATED MANAGEMENT AND DISPLAY OF BOOKING STATUS

(75) Inventors: Sena Manuel, Attleboro, MA (US); Glen Bourgeois, Fiskeville, RI (US)

(73) Assignee: The Foxboro Company, Foxboro, MA (US)

( * ) Notice: Subject to any disclaimer, the term of this patent is extended or adjusted under 35 U.S.C. 154(b) by 0 days.

(21) Appl. No.: 09/561,750

(22) Filed: Apr. 29, 2000

Related U.S. Application Data

(60) Provisional application No. 60/133,017, filed on May 7, 1999.

(51) Int. Cl.[7] ................................................ G09G 5/00
(52) U.S. Cl. ........................ 345/763; 345/736; 345/835; 705/5
(58) Field of Search ................................ 345/835, 807, 345/763, 734–740, 767; 705/5, 6, 8, 9

(56) References Cited

U.S. PATENT DOCUMENTS

| | | | |
|---|---|---|---|
| 4,318,177 A | 3/1982 | Rapp et al. | 364/502 |
| 4,432,064 A | 2/1984 | Barker et al. | 364/550 |
| 4,675,147 A | 6/1987 | Schaefer et al. | 376/245 |
| 4,788,636 A | 11/1988 | Shiratori et al. | 364/191 |
| 4,850,703 A | 7/1989 | Hanaoka et al. | 366/160 |
| 5,005,116 A | 4/1991 | Fujita et al. | 364/188 |
| 5,113,350 A | 5/1992 | Sargent | 364/478 |
| 5,140,537 A | 8/1992 | Tullis | 364/578 |
| 5,271,045 A | 12/1993 | Scarola et al. | 376/216 |
| 5,289,877 A | 3/1994 | Naegele et al. | 166/285 |
| 5,295,062 A | 3/1994 | Fukushima | 364/188 |
| 5,365,435 A | 11/1994 | Stephenson | 364/420 |
| 5,452,213 A | 9/1995 | Ito et al. | 364/468 |
| 5,493,489 A | 2/1996 | Tamaki et al. | 364/401 |
| 5,590,269 A * | 12/1996 | Kruse et al. | 705/9 |
| 5,596,502 A | 1/1997 | Koski et al. | 364/468.01 |
| 5,812,055 A | 9/1998 | Candy et al. | 340/525 |
| 5,835,898 A | 11/1998 | Borg et al. | 705/8 |
| 5,890,131 A | 3/1999 | Ebert et al. | 705/7 |
| 5,963,911 A * | 10/1999 | Walker et al. | 705/7 |
| 6,023,702 A * | 2/2000 | Leisten et al. | 707/100 |
| 6,036,345 A * | 3/2000 | Jannette et al. | 700/97 |
| 6,115,642 A * | 9/2000 | Brown et al. | 700/104 |
| 6,133,905 A * | 10/2000 | Edo et al. | 345/156 |
| 6,256,649 B1 * | 7/2001 | Mackinlay et al. | 707/503 |
| 6,275,812 B1 * | 8/2001 | Haq et al. | 705/11 |
| 6,289,368 B1 * | 9/2001 | Dentler et al. | 709/101 |

FOREIGN PATENT DOCUMENTS

| | | |
|---|---|---|
| DE | 42 29 234 A1 | 3/1993 |
| EP | 0 306965 A2 | 3/1989 |

OTHER PUBLICATIONS

Richard A. Kemmerer, "Shared Resource Matrix Methodology: An Approach to Identifying Storage and Timing Channels," vol. 1, No. 3, Aug. 1983, pp. 256–277.*

"Keeping Users Aware of the Status of an Object Affected by Multiple Programms," IBM Technical Disclosure Bulletin, vol. 37, Issue No. 2B, pp. 241–242, Feb. 1, 1994.*

"Transportation Metaphore Workflow Status Display," IBM technical Disclosure Bulletin, vol. 35, issue No. 3, pp. 4–10, Aug. 1, 1992.*

Sinha et al.; "EXDAFS– An Expert System For Dynamic Allocation of Facilities at Stations", Proceedings of the Seventh Conference on Artificial Intelligence Applications, Sponsored by the IEEE Computer Society Miami Beach Florida pp. 419–424 (Feb. 24–28, 1991).

International Search Report.

* cited by examiner

Primary Examiner—John Cabeca
Assistant Examiner—Tadesse Hailu
(74) Attorney, Agent, or Firm—Kevin A. Oliver; Foley Hoag LLP

(57) ABSTRACT

The present invention provides a method and system for graphically displaying status information concerning the allocation of a process resource to a process entity. More particularly, the present invention provides a method and system for displaying the booking status between process entities and process resources in a control processing system. In order to display booking status between processing entities and process resources, the present invention identifies a process resource and multiple process entities (each of each can operate with the process resource), and displays a status indicator responsive to the status of booking requests of identified process entities for the identified process resource.

34 Claims, 20 Drawing Sheets

METHOD AND APPARATUS FOR AUTOMATED MANAGEMENT AND DISPLAY OF BOOKING STATUS

This application claims priority under 35 U.S.C. 119(e) to co-pending U.S. provisional application Ser. No. 60/133,017, filed May 7, 1999 now pending, the contents of which are hereby incorporated by reference.

TECHNICAL FIELD

This invention relates generally to the management and the graphical display of shared processing resources allocation status information. The method and apparatus of the invention have many applications in any process industry where distinct processing entities need to share common processing resources. They are described herein with particular reference to an illustrative one, namely a batch processing system and, more particularly, to the management and display of booking status between process entities and process resources in a batch processing system.

BACKGROUND OF THE INVENTION

Many industrial processes employ automatic batch processing and many of the industrial processes share resources. For example, in a cookie batter plant, the manufacture of a first type of cookie (i.e. a first industrial process) may require the use of resources, such as an ingredient storage tank and a supply pump. Similarly, the manufacture of a second type of cookie (i.e. a second industrial process) may also require the use of the same storage tank and pump. If a resource is shared by more than one processing entity, it is useful for an operator of a control system in the cookie batter plant to know which process entities have entered booking requests for process resources and which ones have been granted. It is also advantageous for the operator to know the order in which the booking requests were received, so as to optimally control the distribution of the shared process resource. It is additionally desirable for the operator to be able to control the granting of a booking request for any process resource. Unfortunately, conventional systems do not provide such capabilities.

In conventional batch processing control systems, the operator is provided with no visual information regarding the identities of processing entities that have made booking requests for resources, other than a given processing entity is waiting for a resource. No information is provided from the viewpoint of the shared resource regarding the order in which such requests have been received, and no information is provided regarding the identities of the requests that have been allocated. As a result, the burden on the operator to remember and manage such information is quite great, and accordingly, process resources may be booked in a non-optimal manner, traditionally on a first request in first granted basis. In addition, many conventional systems do not provide a mechanism for the operator to modify priorities in booking independently of the automated batch processing control system.

SUMMARY OF THE INVENTION

The present invention addresses and resolves the above-described limitations of resource allocation in conventional batch processing control systems by providing a method and system for graphically displaying status information concerning request for resources by process entities. In one embodiment of the present invention, information is displayed to identify process resources and process entities that can operate with the respective process resources. The displayed information may identify booking requests for process resources, the processing entities that requested the resources, the priorities of the requests for process resources and whether the requests for process resources have been booked.

It is an object of the present invention to provide a method and system for displaying a status indicator that reflects the status of booking requests from identified process entities for the process resources. The status indicator discloses information concerning the status of booking requests, such as the submission of a booking request by a process entity, the acceptance of the booking request by the process resource, and other related information.

In accordance with one aspect of the present invention, an identifier with at least two dimensions is graphically displayed to depict a first process resource and first and second process entities. Each of the first and second process entities can operate with the first process resource. A status indicator is displayed on the display to indicate the status of booking requests of each of the first and second process entities for the first process resource.

In some embodiments, the status information is reflected in a two-dimensional matrix. The matrix includes a first axis representing process entities and a second axis representing process resources. A status indicator is displayed at least one intersection in the matrix. The intersection is associated with one process entity and one process resource.

An apparatus may be provided for displaying the two dimensional matrix. The apparatus may include an indicator generator responsive to first and second report signals of row information and of column information, respectively, to produce indicator signals for displaying, at a matrix intersection on the visible display, a composite indicator. The composite indicator has two graphical indicator portions, each of which has a visible parameter responsive to a different one of the first and second report signals.

The present invention may display the order in which the booking requests are made for a process resource. The priority designation of the booking requests may also be displayed with the display of status of booking requests for the process resource. The status of the process resource when it was not available may be visually indicated on a display. Furthermore, an operator of a computer control system may have the option of controlling the order of priority of booking requests for resources depending upon requirements that were not programmed in the system.

BRIEF DESCRIPTION OF THE DRAWINGS

An illustrative embodiment of the present invention is described below relative to the following drawings.

DESCRIPTION OF ILLUSTRATIVE EMBODIMENT

The illustrative embodiment of the present invention concerns the graphical display of status information for a batch processing system. The illustrative embodiment displays booking status information for process entities and process resources in a batch processing system. When the process entities seek to book use of process resources by submitting booking requests, a booking agent overlay is displayed to show booking status information between process entities and process resources.

The booking agent overlay displays the order in which the booking requests for each process resource are received as well as a priority designation for the booking requests. Thus, for example, the display may indicate that the request from a first process entity has top priority and that the request from a second process entity has the next highest priority. The booking agent overlay displays whether a resource is available for booking.

The booking agent overlay displays status information in a matrix containing rows and columns. Nevertheless, those skilled in the art will appreciate that other display configurations that do not employ matrices may also be used in practicing the present invention. The process entities are represented by rows of the matrix and the process resources are represented by columns. The size of the matrix is limited by the screen size and can be designed for an arbitrary number of requesting process entities and process resources. The graphical elements are located at the intersections of rows and columns of the matrix in order to indicate the status of booking request for a particular process resource by a particular requesting process entity. The status of booking request for a process resource by a requesting process entity is indicated in the graphical elements by color and a numeric value. The graphical elements includes an outer area and an inner area. The outer area of the graphical element shows an active booking request from the requesting process entity for the process resource and changes color when a booking request is made. The inner area changes color when the process resource is booked by the requesting process entity. The numbers displayed in the center of the graphical elements indicate the priorities of the booking requests and the numbers change as each of the booking requests have been honored or manually altered by the operator.

The illustrative embodiment of the present invention enables an operator to control the order of priority based upon requirements that were not programmed into the automated system. As a result, the operator can adjust priorities based on criteria that are not processed by the automated control mechanism.

Figure 1:
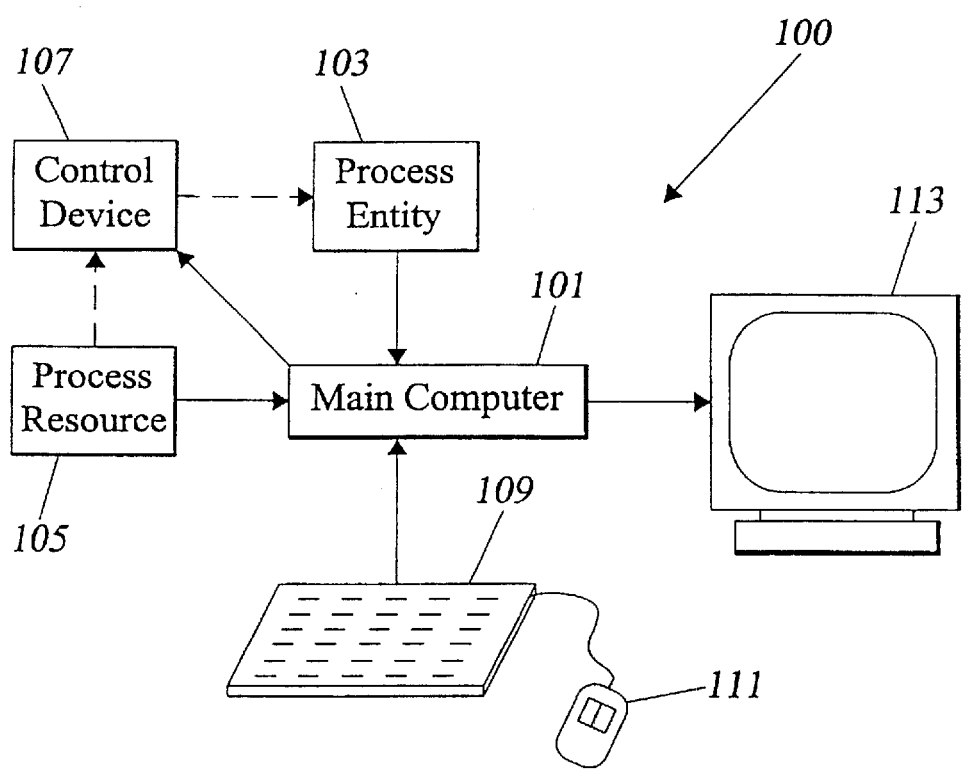
FIG. 1 is a block diagram which illustrates a computerized batch processing system to which the present invention applies.

FIG. 1 is a block diagram which shows an example of a computerized batch processing system to which the illustrative embodiment of the present invention applies. The system 100 includes a control system 101, process entities 103, process resources 105, control devices 107, a keyboard 109 with a pointer 111 and a screen display device 113. The control system 101 controls the entire batch processing system including input controls, process resource flow path controls and display controls. The process entities 103 use process resources 105 to produce a desired product. The control devices 107 open the process resource flow path between the process resource and the process entities to make the process resources flow through the opened path to the process entities. The keyboard 109 with a pointer 111 enables the operator of the batch processing system to input commands and data to the batch processing system 100. The screen display device 113 displays the structure of the batch processing system including structure of the flow path of the resource to help the operator understand the status of the batch processing system.

Those skilled in the art will appreciate that the depiction of the computerized batch processing system in FIG. 1 is intended to be merely illustrative and not limiting of the present invention. The present invention may also be practiced with other batch processing system configurations. For example, the computer system may include different peripheral devices than shown in FIG. 1, and the control system may include multiple computers or may be realized via a distributed system.

In the batch processing system 100, the process entities need process resources based on the product to be manufactured and the order in which processes are performed to produce the product. If process entity 103 needs process resource 105, process entity 103 makes a booking request for the process resource 105. The control system 101 receives the booking request of the process entity 103 for the process resource 105. The control system 101 checks the status of the process resource 105 to determine whether or not the process resource 105 is available. If the process resource 105 is available, the control system 101 generates control signals to operate control devices 107 to supply the process entity 103 with the process resource 105. The control devices 107 may include, for example, a pump and valves that open a flow path through which the process entity 103 is provided with the process resource 105.

Figure 2:
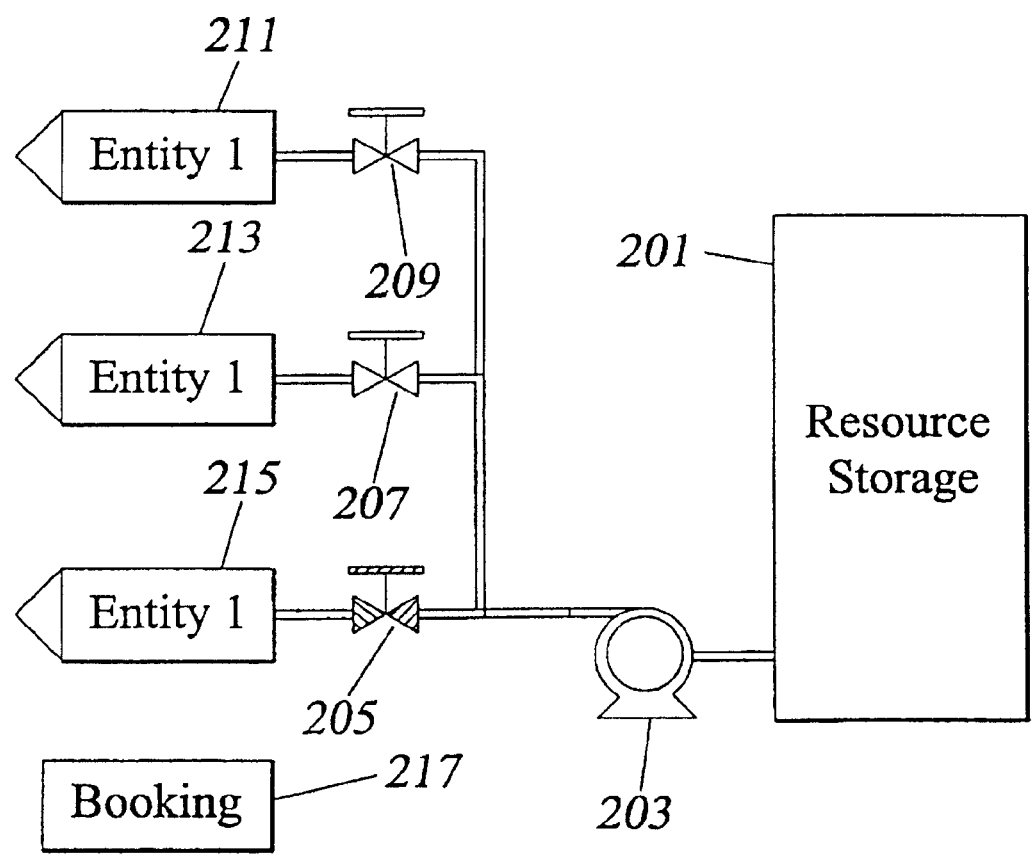
FIG. 2 is an exemplary display of a screen display device in the batch processing system which shows the relationship between process entities and a process resource.

The control system 101 also controls the display of the flow path structure. In particular, the screen display device 113 shows the connection between the process resource 105 and process entities 103 by way of control devices 107. FIG. 2 is a simplified example displayed on the screen display device 113 of the batch processing system. Those skilled in the art will appreciate that the display depicted in FIG. 2 is not an example necessary for this invention but an optional example for the illustrative embodiment. The display of FIG. 2 shows the relationship between process entities and a process resource. The operator can see the resource flow path between the resource storage 201 and the process entities 211–215. A pump 203 is located near the resource storage 201 that contains the resource. The pump 203 is connected to valves 205, 207 and 209 that interface with process entities, such as cooker 211, mixer 213 and harmonizer 215. The display shows that valve 205 interfaced with harmonizer 215 opens. In the case depicted in FIG. 2, the resource is supplied by resource storage 201 to the harmonizer 215 through pump 203 and valve 205 to harmonizer 215.

The display also provides a booking button 217 on the screen display device for initiating a booking agent overlay that displays booking status of the resource. To access the booking agent overlay, an operator clicks on the booking button 217 found on any process graphic.

The booking agent overlays enable an operator to monitor process resources in the batch processing system. These overlays allow the operator to identify which entities have requested process resources, to view the order in which requests were received, and to view the status of those requests. Each time a process entity requests to book a process resource, the booking agent overlay updates to show that a request has been made. In addition, a priority number is assigned to the request and the requested resource is designated as available or busy. The first entity to request a booking is given a priority of 1, the second entity to request a booking is given a priority of 2 and so on. Those skilled in the art will appreciate that the priorities need not be designated numerically (i.e., priority 1, priority 2, etc.); rather the priorities may be designated by a number of labels (e.g., words, letters, symbols, etc.). Also the assignment of these priorities need not be limited to a first in first granted rule basis; other criteria may be applied. The operator has the option of changing the booked status of a process resource by clicking a toggle button provided on the booking agent overlay. The details are described below in more detail.

Figure 3:
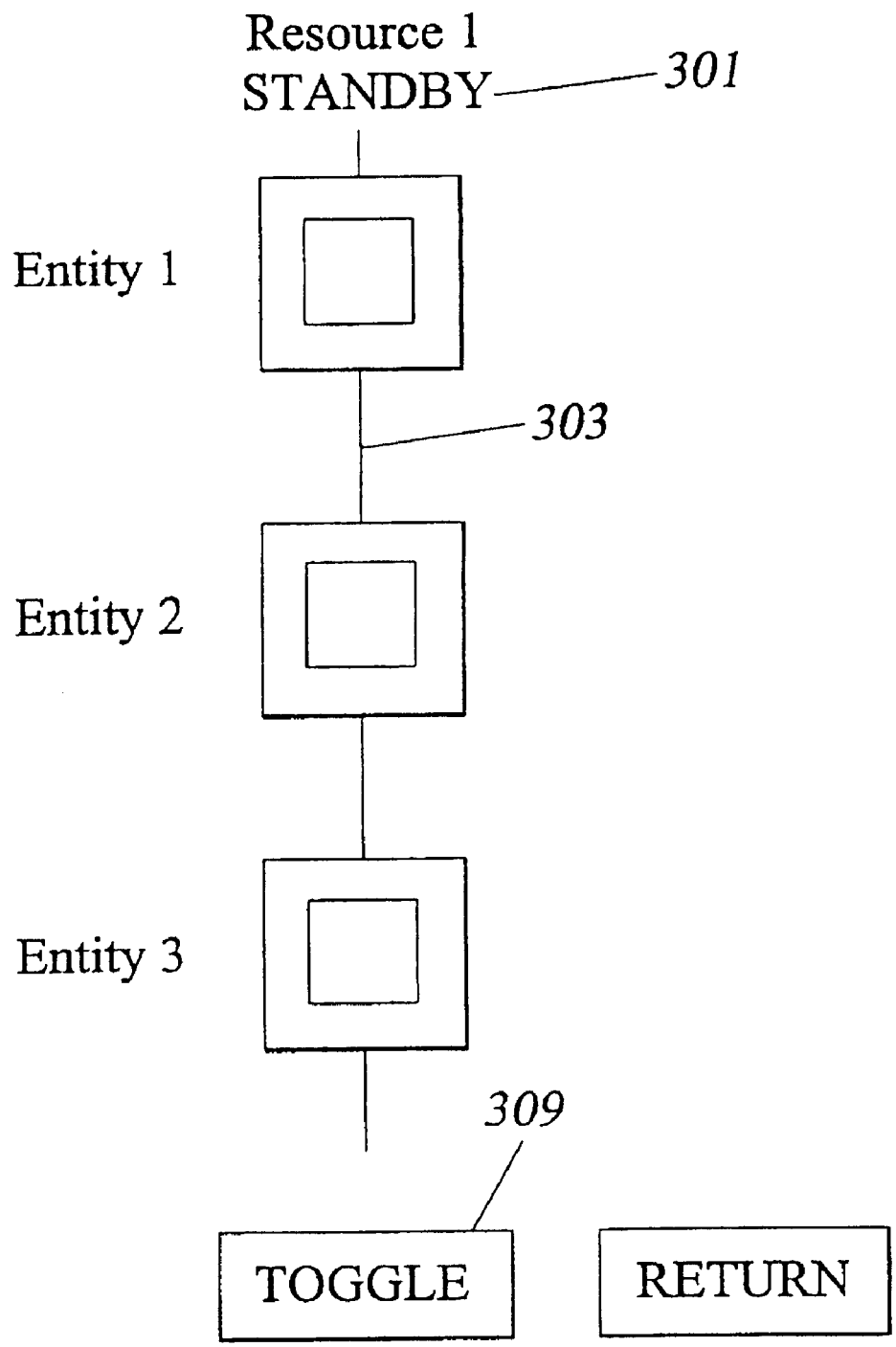
FIG. 3 is an exemplary display of a booking agent overlay to illustrate a standby mode of a process resource.
Figure 4:
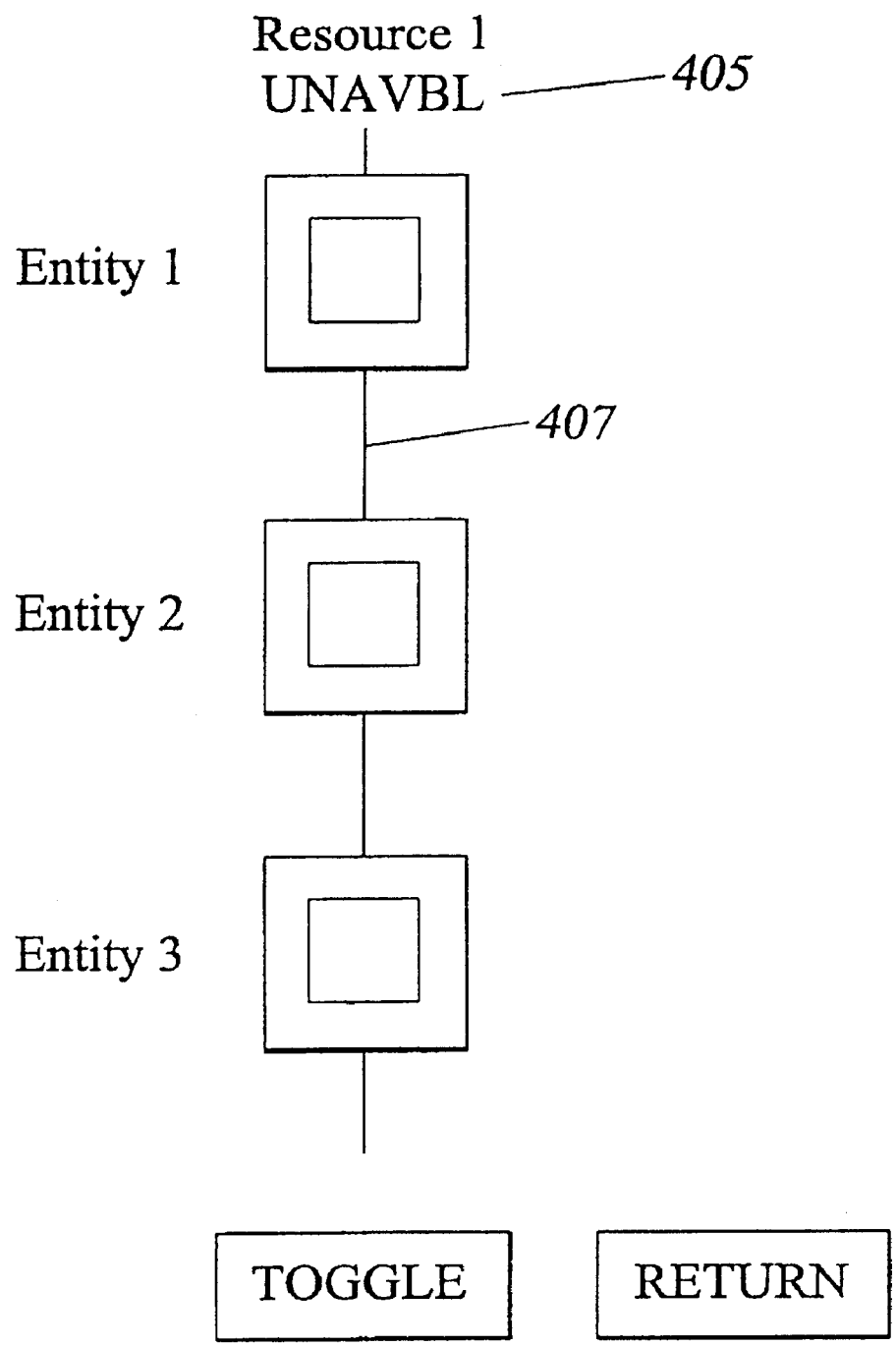
FIG. 4 is an exemplary display of a booking agent overlay to illustrate an unavailable mode of a process resource.

FIGS. 3 and 4 are exemplary displays of a booking agent overlay displayed on the screen display device of the batch processing system of FIG. 2. For the case depicted in FIGS. 3 and 4, one resource is pending and there are three process entities that can book the process resource. Other booking overlays or displays can be more complex depending on the process since process resources can be grouped together by process relations. It is more meaningful to group all the process resources and the process entities into one display due to the interdependent relationships among them. Therefore, a booking agent overlay may contain columns for all the process resources to the process entities required by the system. It would then contain a row for each entity, which is capable of booking these process resources. An example of group all the process resources and the process entities into one display are described below in more detail.

FIGS. 3 and 4 also shows booking agent overlays which illustrate a standby mode and an unavailable mode of a process resource, respectively. In FIG. 3, the process resource has no pending booking requests of process entities, and the process resource is in a standby mode available for booking. The word "STANDBY" 301 is displayed and an uncolored line 303 through the center of the booking boxes identifies the resource as being in standby mode. In contrast, FIG. 4 shows an instance where a process resource unit is unavailable for booking. The word "UNAVBL" 405 is displayed and a yellow line 407 is depicted through the center of the booking boxes to designate the unavailability of the process resource. When the process resource is unavailable, the booking request and assigned priorities will still be recorded by the control system 101 and displayed accordingly. However, no booking will be granted until the process resource unit becomes available.

Those skilled in the art will appreciate that other types of user interface elements may be used to designate where a process resource is in standby mode or available. Moreover, audio output may accompany the graphical output or be used in place of the graphical output.

Figure 5A:
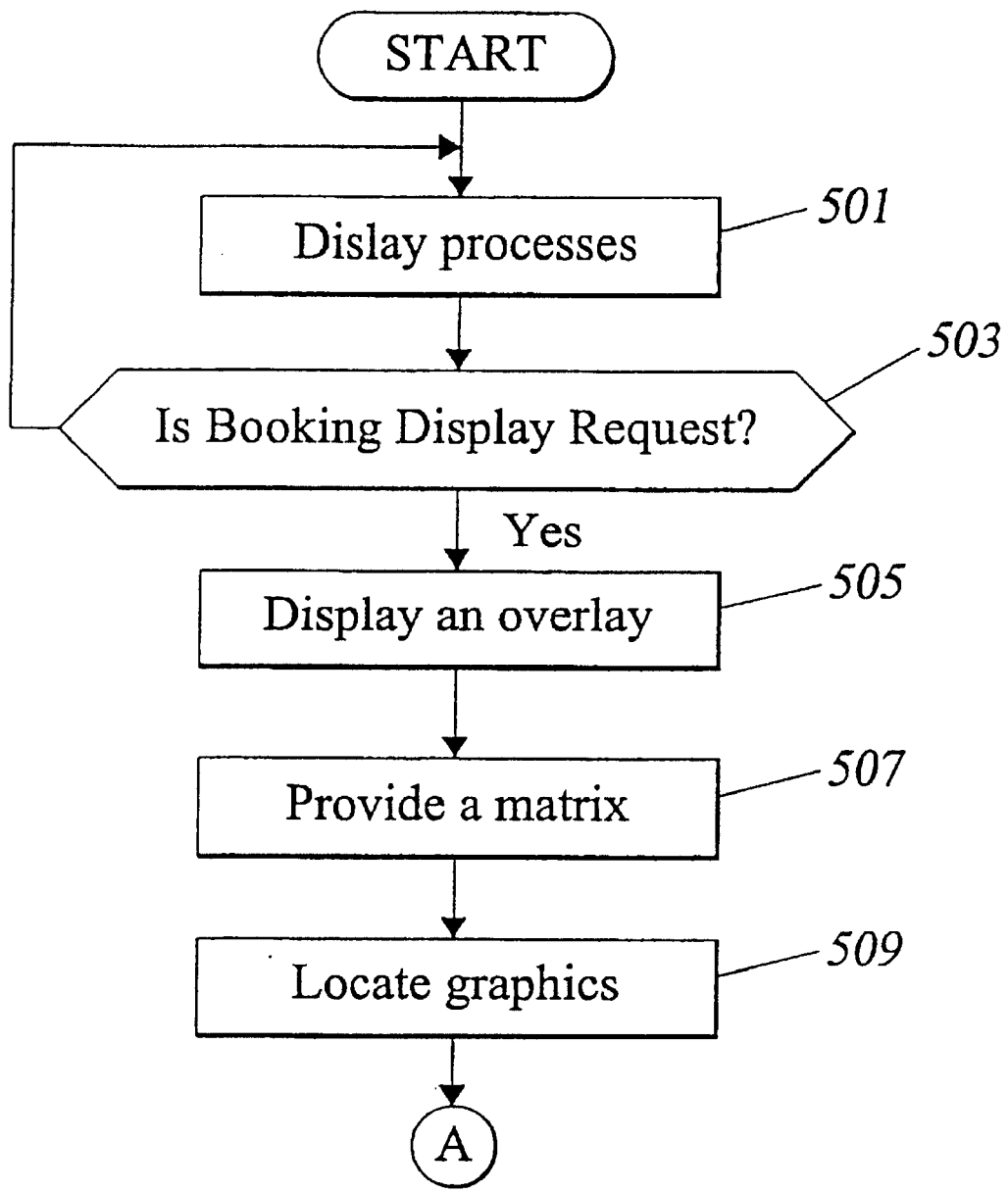
FIGS. 5A–5D are flowcharts which illustrate the steps that are performed in the illustrative embodiment of the present invention.

FIGS. 5A, 5B, 5C and 5D are flow charts which show a method for displaying and controlling the status of booking requests of process entities for process resources in accordance with the illustrative embodiment of the present invention. FIG. 5A is a flow chart which shows initial steps for displaying and controlling a booking agent overlay. The batch processing system displays the flow path structure of process resources on a screen display device 113 of the batch processing system (step 501). The operator can see the resource flow path between the resource storage and the process entities. A booking button is provided on the display in order to initiate a booking agent overlay for displaying booking status of process resources. If the booking button 217 is input (step 503), the booking agent overlay is displayed on the display screen device displaying resource flow path structure of the system (step 505). For the purpose of showing the booking status, the process entities and the process resources are identified in a matrix in which columns correspond to process resources and rows to requesting process entities (step 507). The process entities appear at the left portion of each row of the matrix and the process resources are located at the top of each column of the matrix. The next step is to locate status indicators at the intersection of the process resources and the process entities which can make a booking request for the resource (step 509). If the process entity can not book the process resource, the intersection where the process entity meet with the process resource remains blank.

Figure 5B:
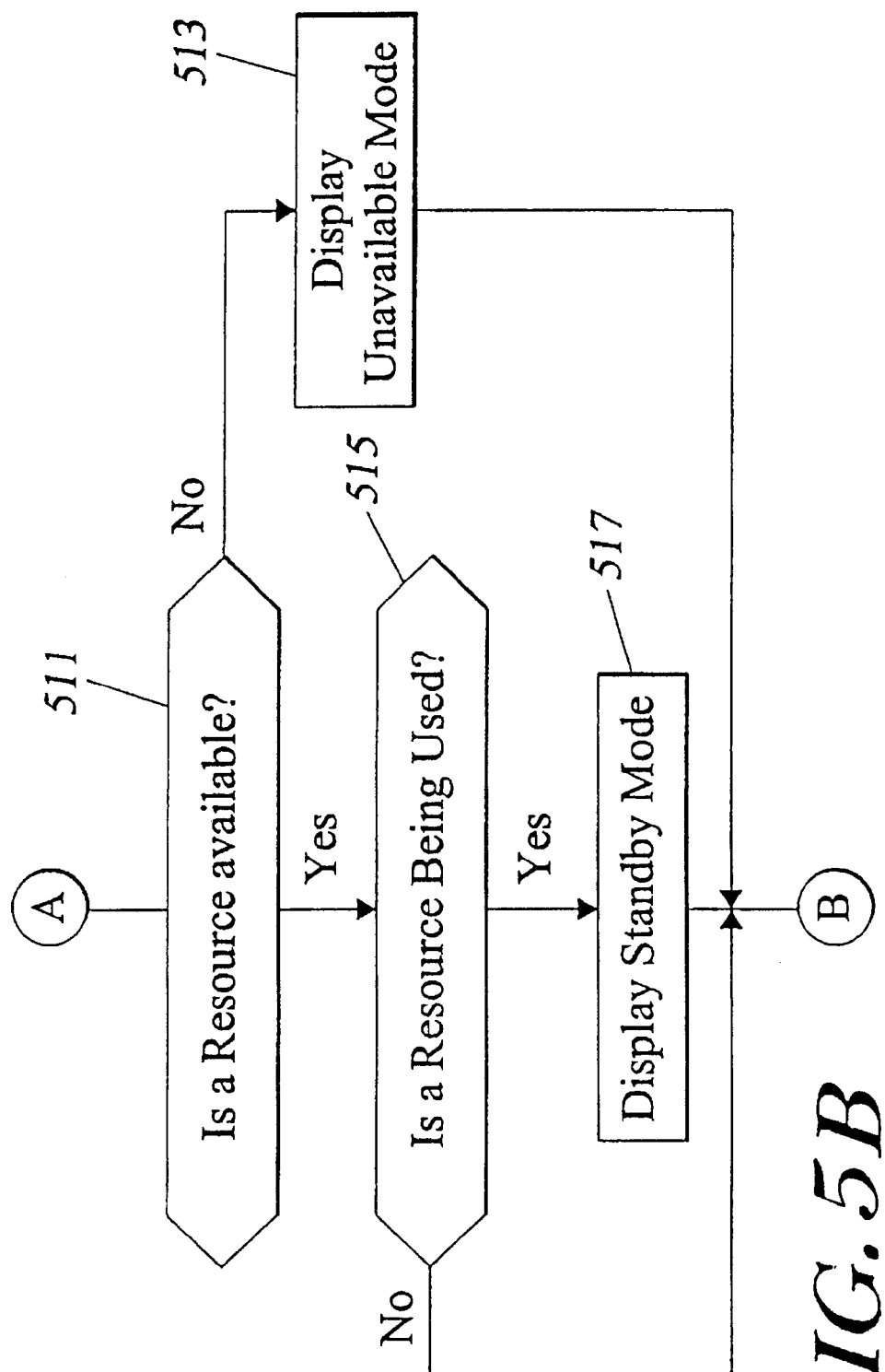

FIG. 5B is a flow chart which shows the steps that are performed to reflect the availability of process resources in the booking agent overlay. If a process resource is unavailable for booking (step 511), the word "UNAVBL" 405 is displayed under the name of the process resource and line 407 through the center of the booking boxes may be colored, for example yellow, to depict the unavailability of the resource (step 513). When the process resource is unavailable, the booking request and priorities assigned will be recorded in the memory element 305 of batch processing system and still displayed to the operator. No booking will be granted until the process resource becomes available. If the process resource is available and has no pending booking requests of process entities (step 515), the word "STANDBY" 401 is displayed under the name of the process resource (step 517). If the process resource is available and booked by one of the process entities, besides having pending booking requests from other process entities, no word is displayed under the name of the process resource, indicating that the process resource is busy or pending.

Figure 5C:
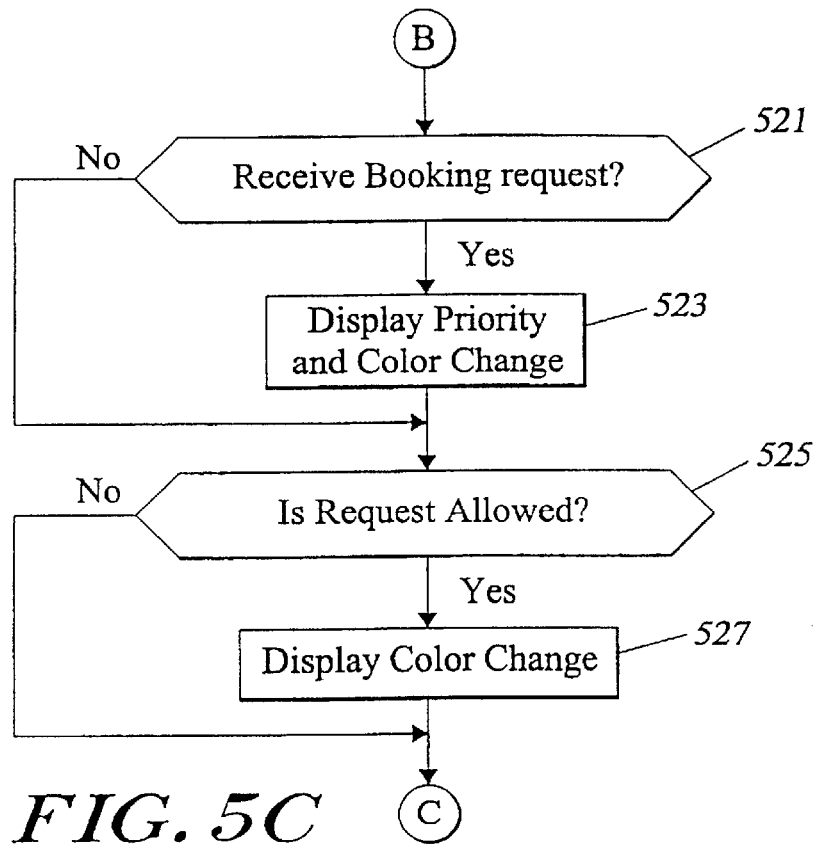

FIG. 5C is a flow chart which shows the steps that are performed for changes of a status indicator responsive to the booking requests and the availability of the process resources. The status indicators describe the status of the booking requests with colors (oblique lines) and numbers. The status indicator is composed of two parts, an outer area and an inner area. If a booking request is made from a requesting process entity to the process resource (see step 521), the outer area of the status indicator are painted with color (oblique lines) (step 523). The numbers in the center of status indicator indicate the priorities of the booking request and change as each of booking requests is made (step 523). If the process resource is booked by the requesting processing entity (see step 525), the inner area changes color (oblique lines) (step 527).

Figure 5D:
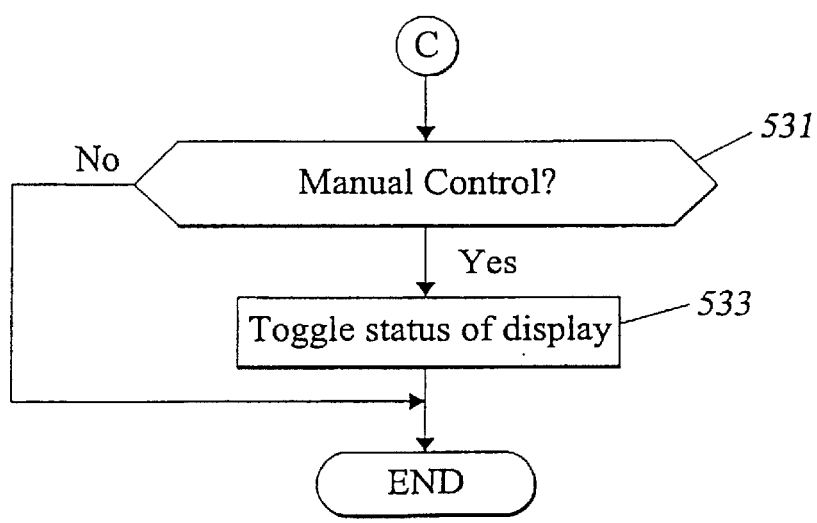

FIG. 5D is a flow chart which shows the steps that are performed for manual change of status indicator by a toggle button 309 in FIG. 3 in the illustrative embodiment of the present invention. The toggle button 309 at the bottom of the display allows the operator to place or remove a booking request for a process resource, by which the booking status can be changed. If the operator clicks the target area to change in the status indicator and presses the toggle button 309 (step 531), the booking status of process resource is toggled, and the priorities are automatically updated as the process resource is booked and unbooked (step 533).

Figure 6A:
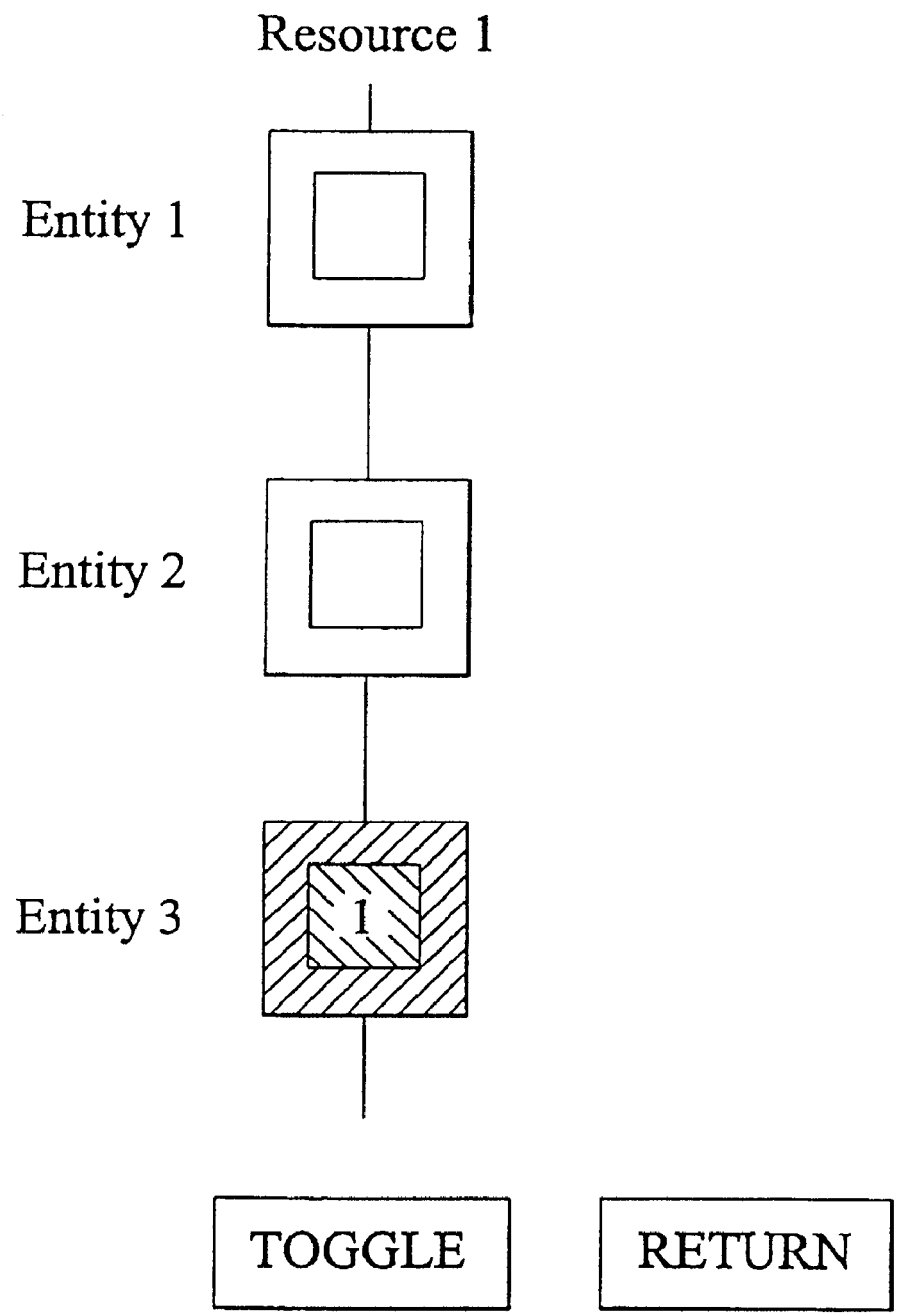
FIGS. 6A–6D are exemplary displays of a booking agent overlay which illustrate exclusive mode of a process resource.

FIGS. 6A, 6B, 6C and 6D are exemplary displays of a booking agent overlay which illustrate exclusive mode of a process resource. FIG. 6A shows the booking status of FIG.

2 where process entity 215 (entity 3) has submitted a booking request to the process resource 201. The booking of the request is indicated by the outer box of the two grouped boxes changing from white to oblique lines. Also the number in the center of the two boxes gives additional information on the request. The number specifies the priority of the booking request. Every booking request is given a priority that governs which requesting process entity will be allowed to book the process resource. In the above example, process entity 205 (entity 3) has been allowed to book the process resource unit. This is shown by the center box of the two grouped boxes changing from white to oblique lines.

Figure 6B:
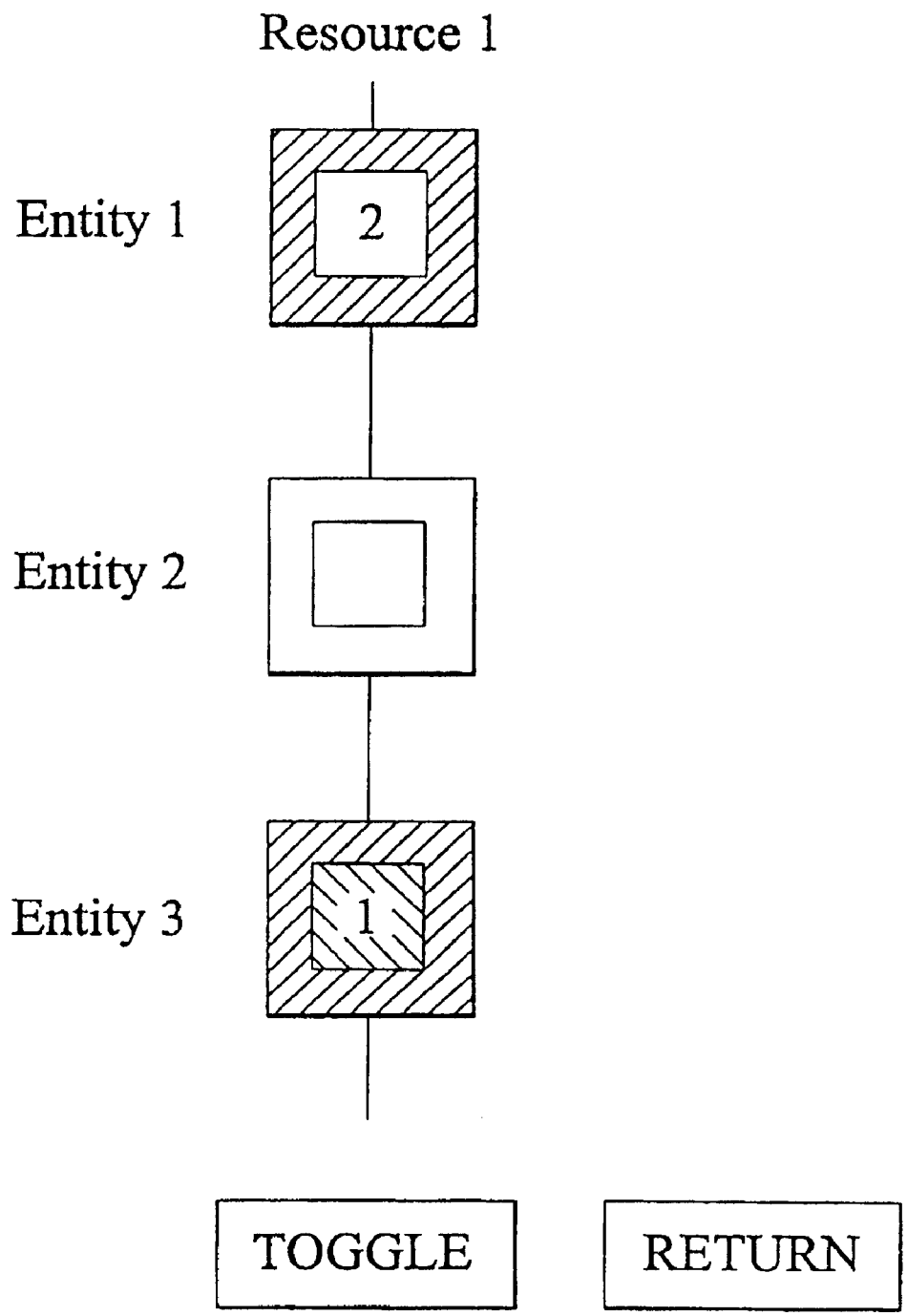
Figure 6C:
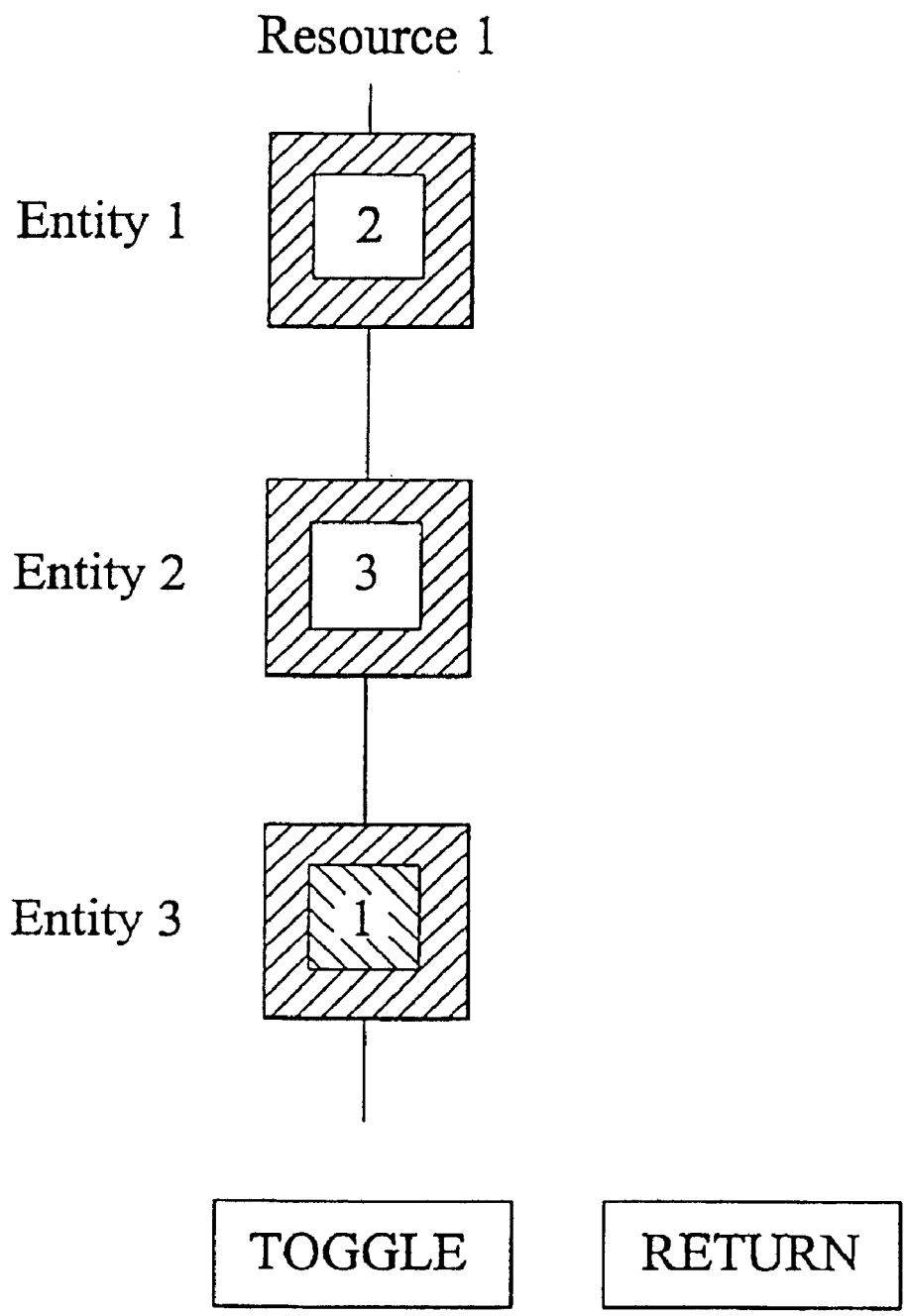
Figure 6D:
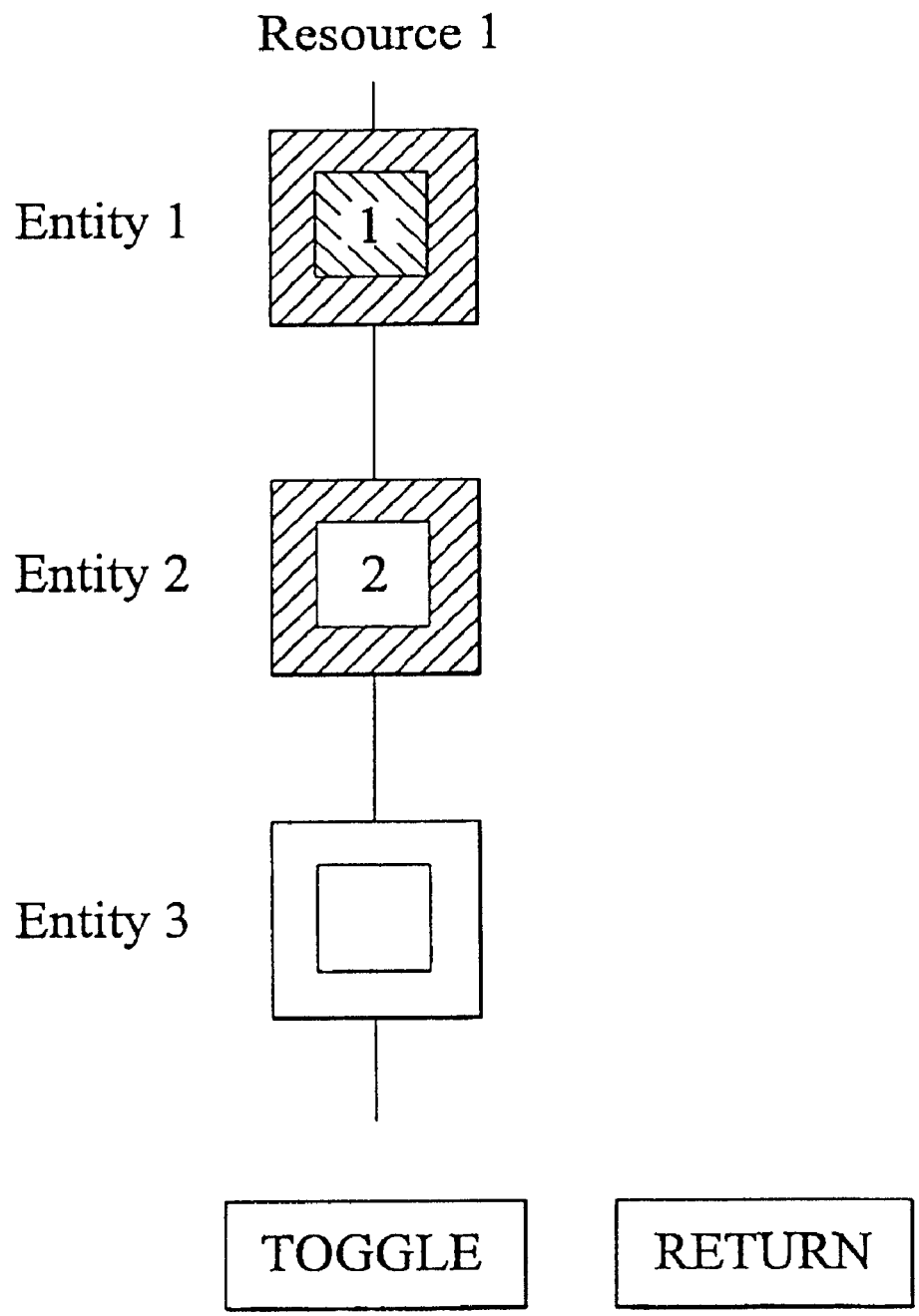

In an exclusive booking mode, only one process entity has permission to book the process resource. FIGS. 6B, 6C and 6D further demonstrate the functionality of the booking agent logic and graphics in an exclusive booking mode. In FIGS. 6B and 6C, the process resource receives booking requests from process entity 1 and process entity 2, respectively. Since the process resource is in an exclusive booking mode, the booking requests from process entity 1 and process entity 2 are recorded, but these two entities will not be granted booking status until process entity 3 releases its booking request. FIG. 6D shows the release of the booking request by process entity 3 and the transfer of booking to process entity 1. The batch processing system allows process entity 1 to book the resource. Process entity 1 received the booked status over process entity 2 due to a more significant priority. The lower the priority number is the more significant the priority.

Figure 7A:
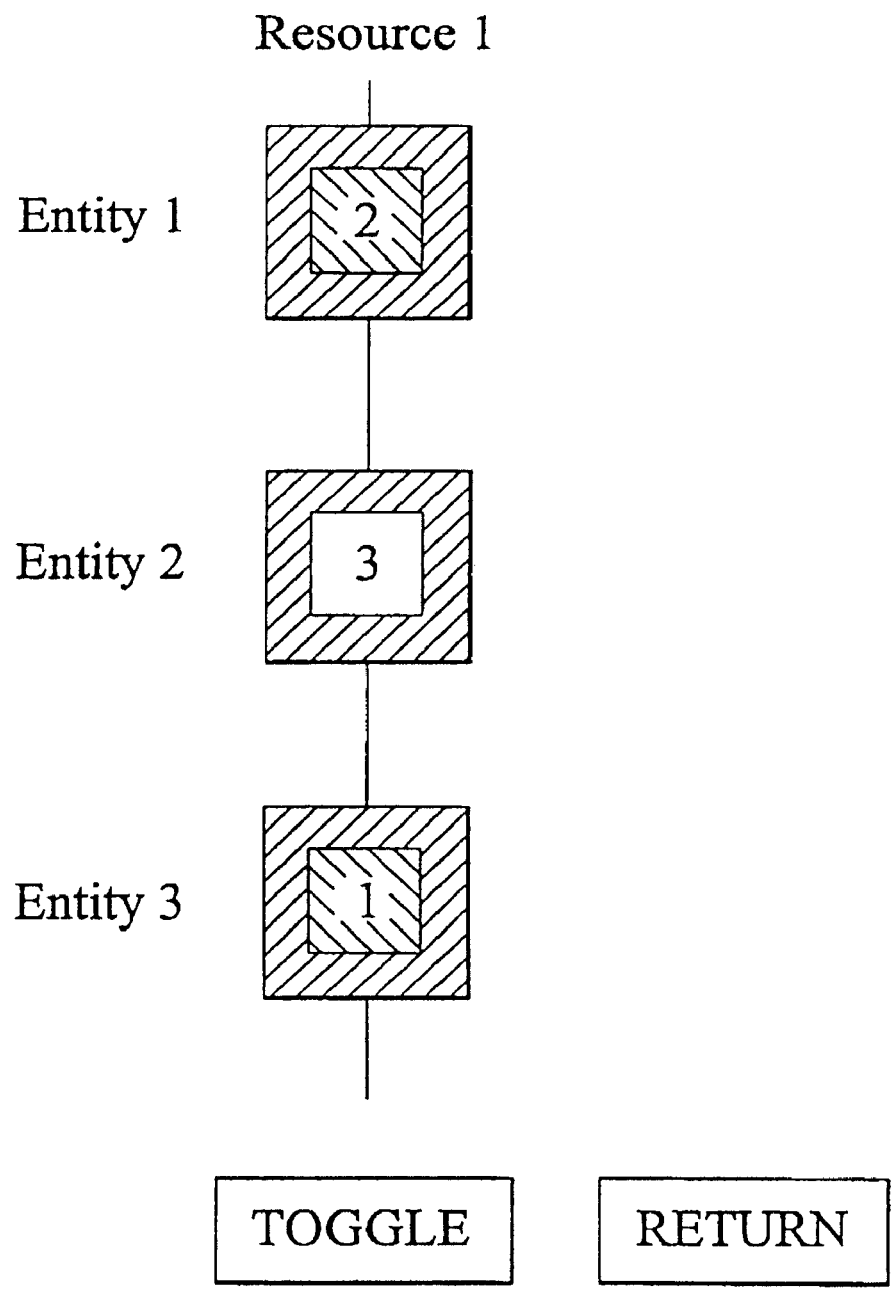
FIGS. 7A and 7B are exemplary displays of a booking agent overlay which illustrate nonexclusive mode of a process resource.
Figure 7B:
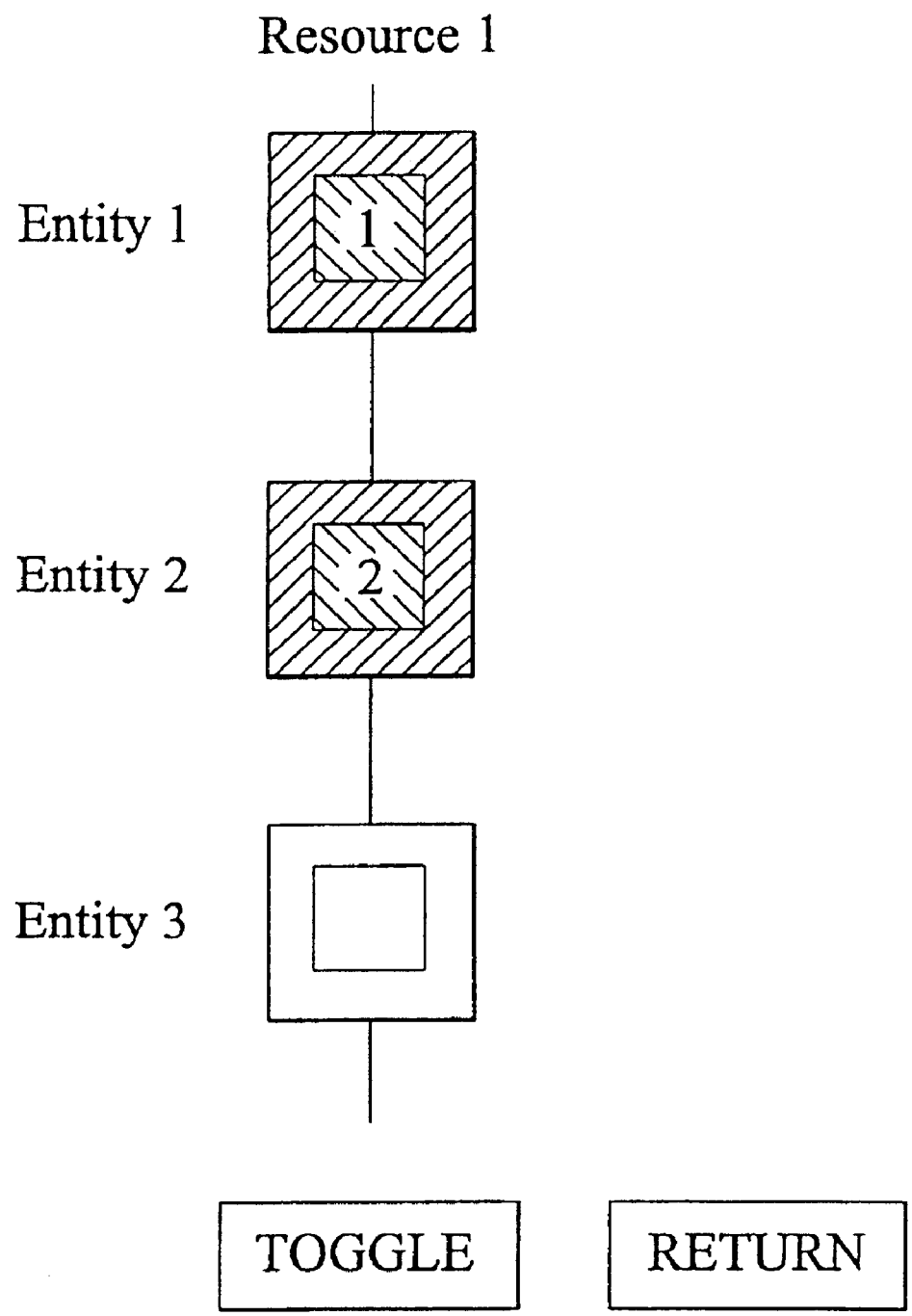

FIGS. 7A and 7B are exemplary displays of a booking agent overlay which illustrate non-exclusive mode for a process resource. In this example, the process resource unit will grant a maximum of two simultaneous booking requests. In FIG. 7A, the process resource has allowed booking by both process entity 3 and process entity 1. Process entity 2 has requested booking, but this request has not been granted because the maximum allowable number of bookings has been reached. The priority of process entity 2 confirms it was the last to submit a booking request. Since the maximum number of granted booking requests is limited to two, process entity 2 must wait for either process entity 1 or process entity 3 to release it's booking of the process resource. In FIG. 7B, process entity 3 has released its booking request, and as a result, process entity 2 has its booking request granted. This sequence could have resulted, for example, from an automated batch controller releasing the resource or it could have been done by the operator using the Toggle button at the bottom of the overlay. To book or release a resource, a user selects the rectangle representing that operation and clicks on the Toggle button. If the resource is booked, it becomes unbooked. If the resource is not currently booked, a booking request is sent and shown on the overlay. Once the resource becomes available, it is booked automatically.

Figure 8A:
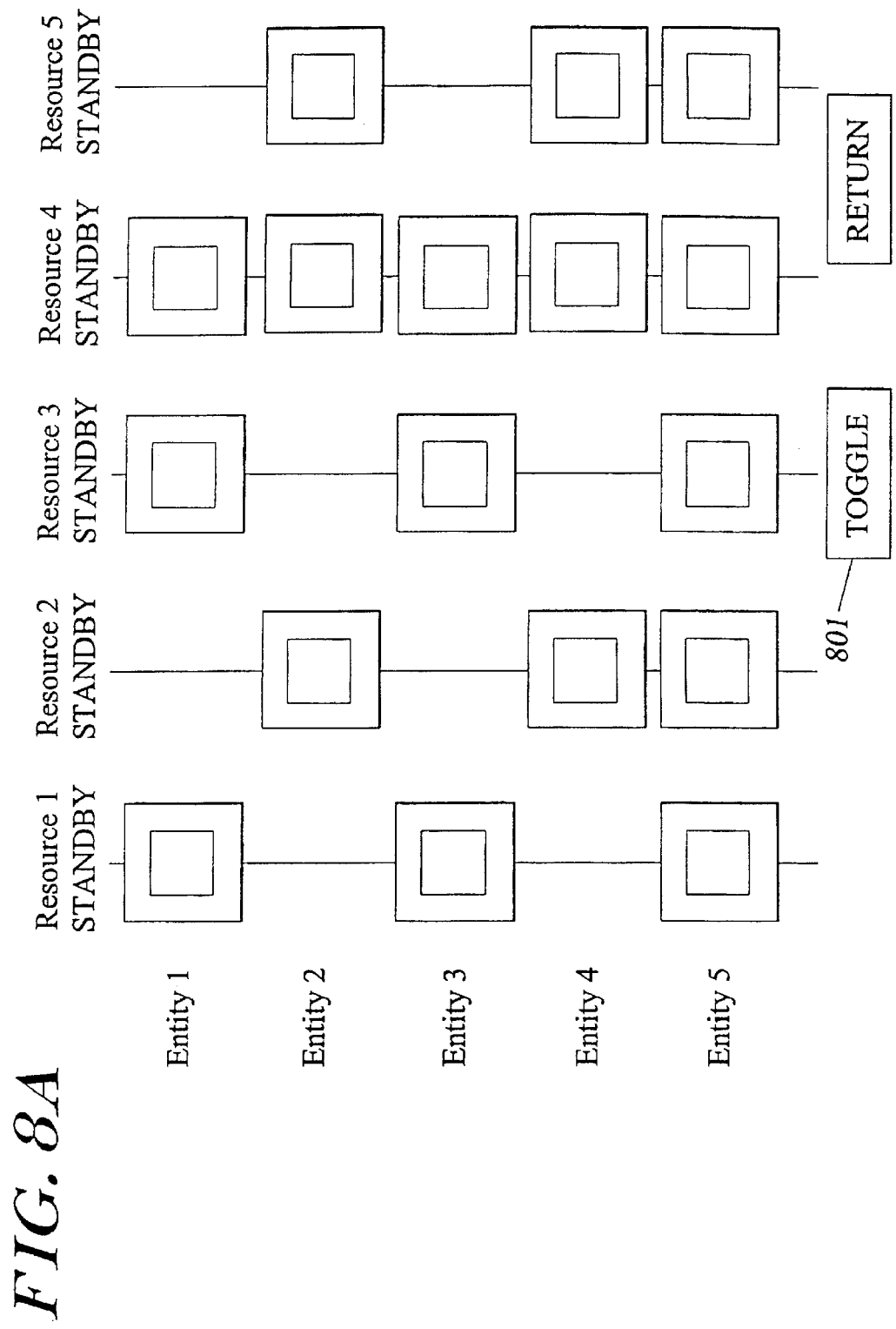
FIGS. 8A–8G are exemplary displays of a booking agent overlay which shows the relationship between process entities and a process resource.

FIGS. 8A–8G are exemplary displays of a booking agent overlay which shows the relationship between multiple process resources and process entities. FIG. 8A shows a booking display matrix for a more complex group of equipment. The process resources are shown in column headers and the process entities is shown in rows of the matrix on the left-hand side. The matrix is not symmetrical and the blank portion indicates that there exists no path in the process for a requesting process entity to be able to book a particular process resource. The TOGGLE button 801 at the bottom allows the operator to manually place or remove a booking request for a process resource, by which the order of the priorities can be changed The priorities are automatically changed as the process resources are booked and unbooked either manually or by the process entities.

Figure 8B:
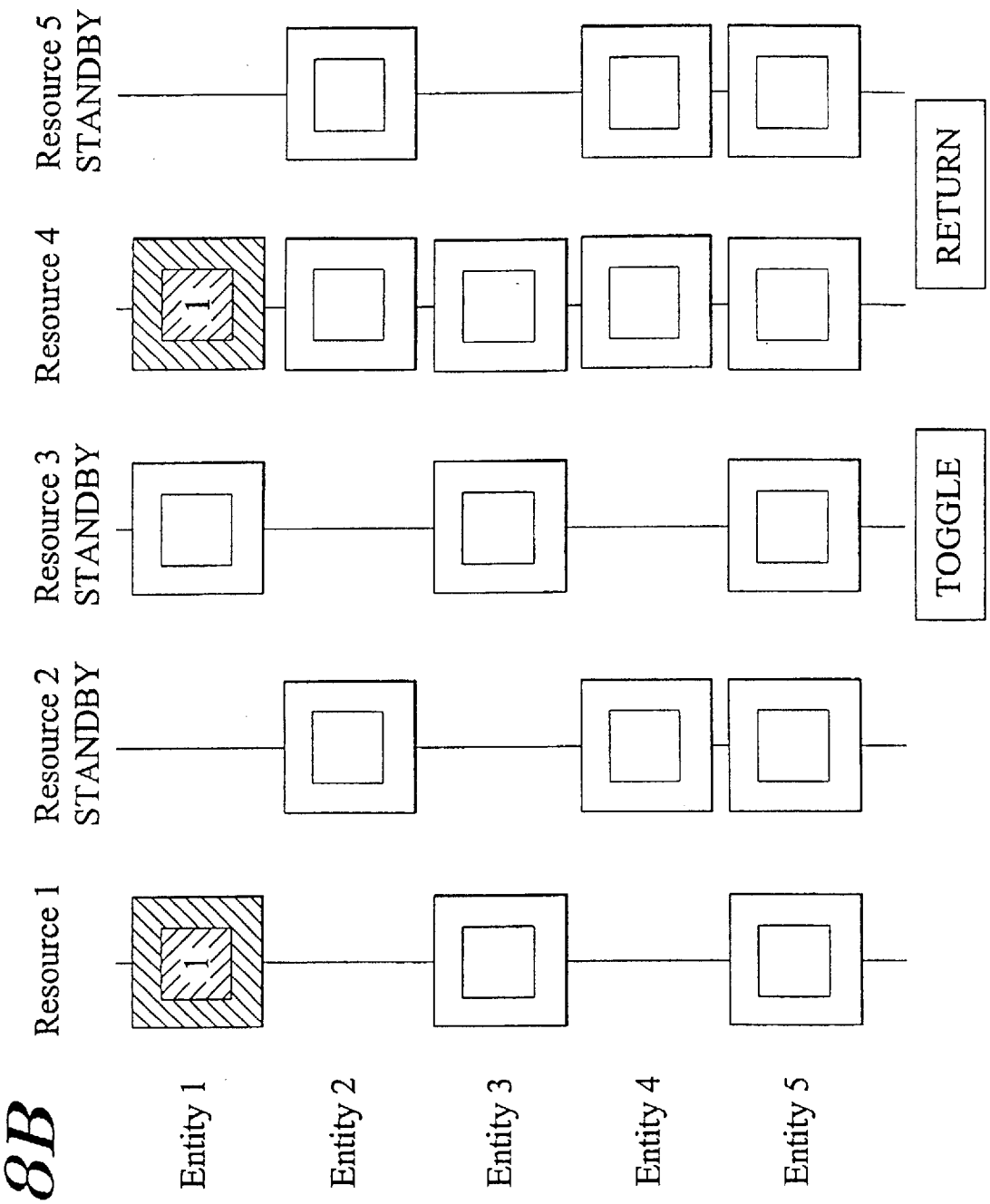

FIG. 8A is an example of an initial display of an illustrative embodiment of the present invention. The display of the present invention is based on a matrix in which columns correspond to process resources and rows to requesting process entities. The size of the matrix is limited by the screen size and can be designed for an arbitrary number of requesting process entities and process resources. The process resources are shown in column headers and the requesting process entities are shown on the left hand side of each row in the matrix. Rectangular graphical elements are located at the intersections of rows and columns in the matrix if the requesting process entity at the row shares the resource at the column. Rectangular graphical elements describe the status of the booking requests with colors (oblique lines) and numbers. Rectangle type of graphical elements are composed of two parts, an outer area and an inner area. The outer area of the graphical element shows the active booking request from a requesting process entity to process resources. The outer area of the graphical element will be painted with color (oblique lines) when a booking request is made. The inner area changes color (oblique lines) when the process resource is actually booked by the requesting processing entity. The numbers in the center of graphical elements indicate the priorities of the booking request and will change as each of the booking requests are recorded. The toggle button at the bottom of the display allows the operator to manually book and unbook a process resource. The operator can change the order of the priorities in a booked resource by pressing the toggle button. The priorities are automatically updated as the process resources are booked and unbooked either manually or by the requesting process entities FIG. 8B is an example of another display which illustrates the priorities of initial booking requests. As shown in FIG. 8B, a requesting process entity 1 initially books the process resources of resource 1 and resource 4. The colors of rectangular graphical elements indicates that these two resources have been booked and the priority assigned is 1. The other resources such as resource 2 and resource 3 are in a standby mode and therefore can be booked by other requesting process entities.

Figure 8C:
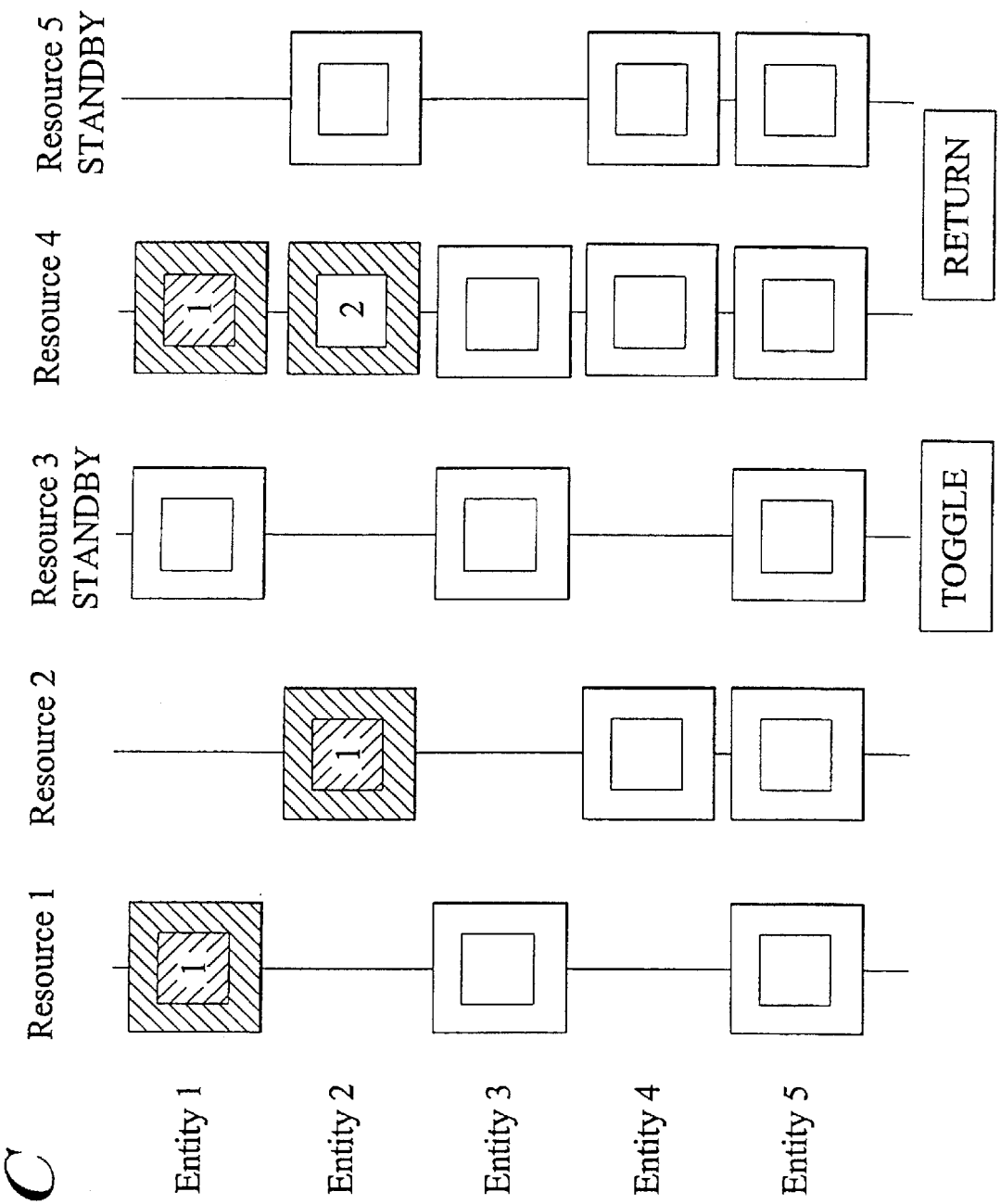

FIG. 8C is an example of another display of present invention which illustrates additional priorities of booking requests relative to FIG. 8B. As shown FIG. 8C, entity 2 has booked resource 2 and resource 4. In this display, entity 2 is given a priority of 2 and the color shows that it is pending because entity 1 is already booked in FIG. 8B.

Figure 8D:
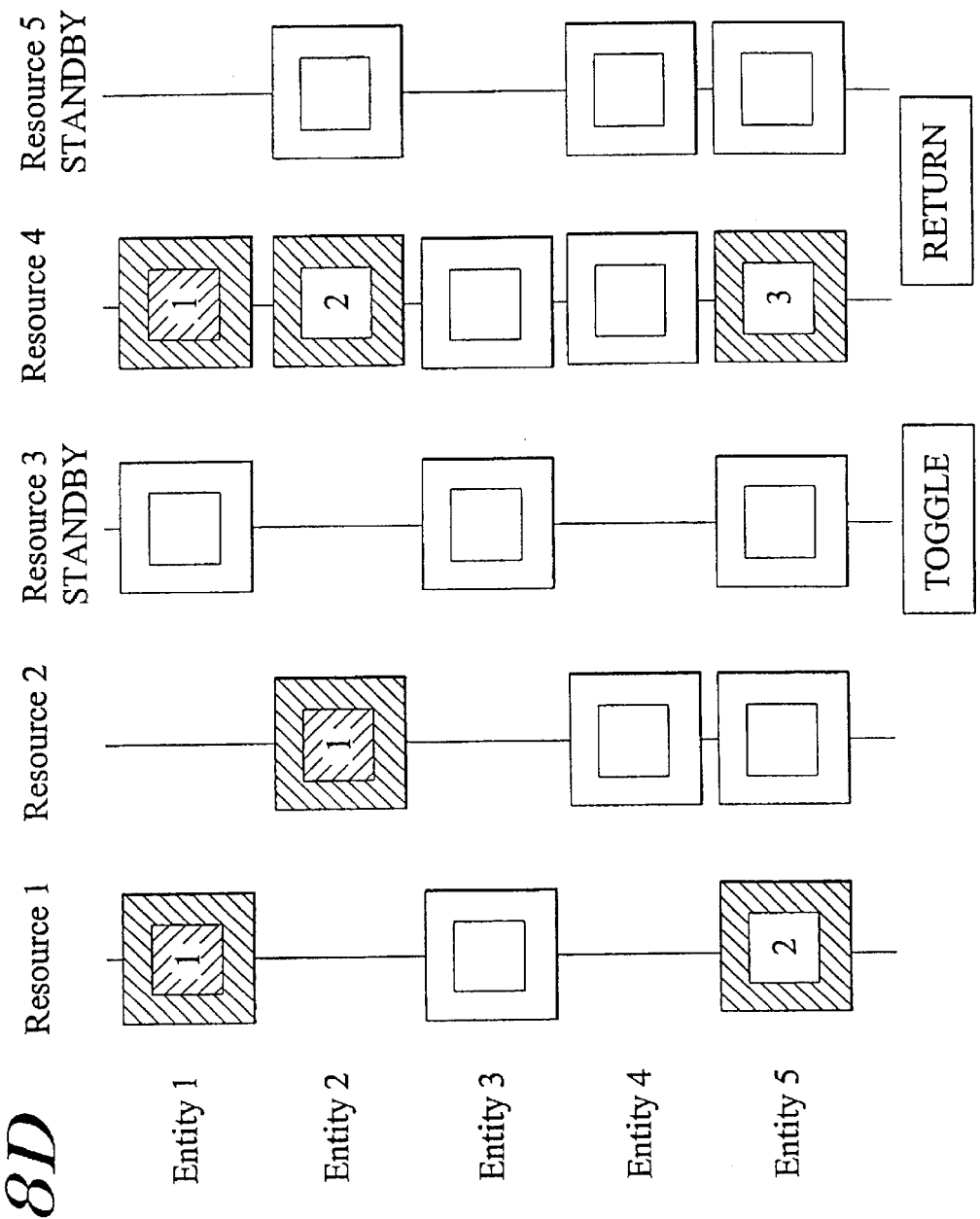

FIG. 8D is an example of another display of the present invention which illustrates additional priorities of booking requests relative to FIG. 8C. As shown in FIG. 8D, the requesting process entity 5 has requested a booking of process resource 1 and resource 4. The priority of resource 1 is 2 because resource 1 is still being used by entity 1; the resource 4 shows a priority of 3 because of the previous booking by entity 1 and outstanding request from entity 2.

Figure 8E:
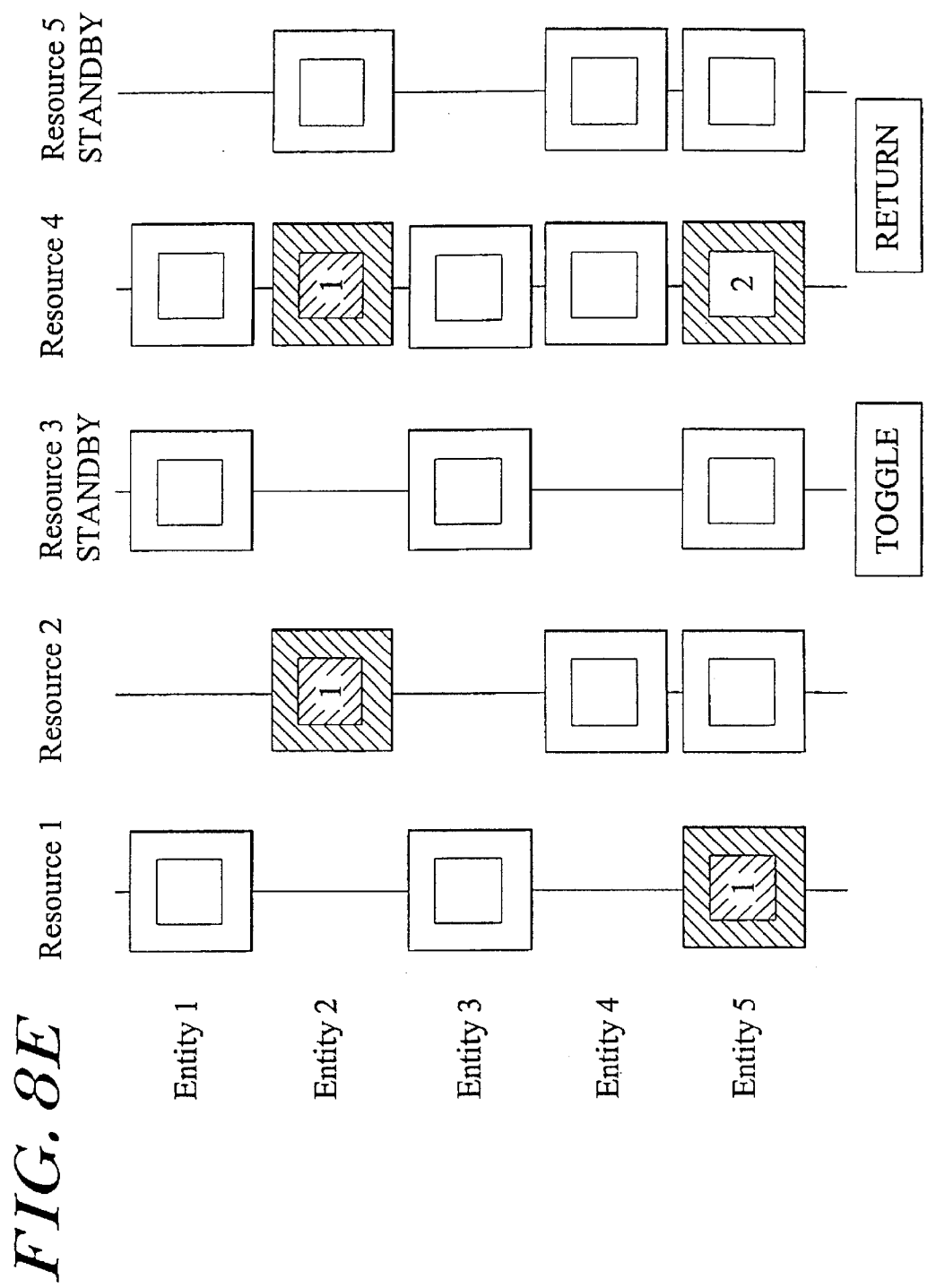

FIG. 8E is an example of another display of the present invention which illustrates the change of priorities relative to FIG. 8D. The requesting process entity 1 has finished with the process resource 1 and resource 4. The requesting process entity 2 has been given control over its outstanding requests as has process entity 5. The priorities have now been reshuffled to show the current status of process entity 5 waiting for the process resource 4.

Figure 8F:
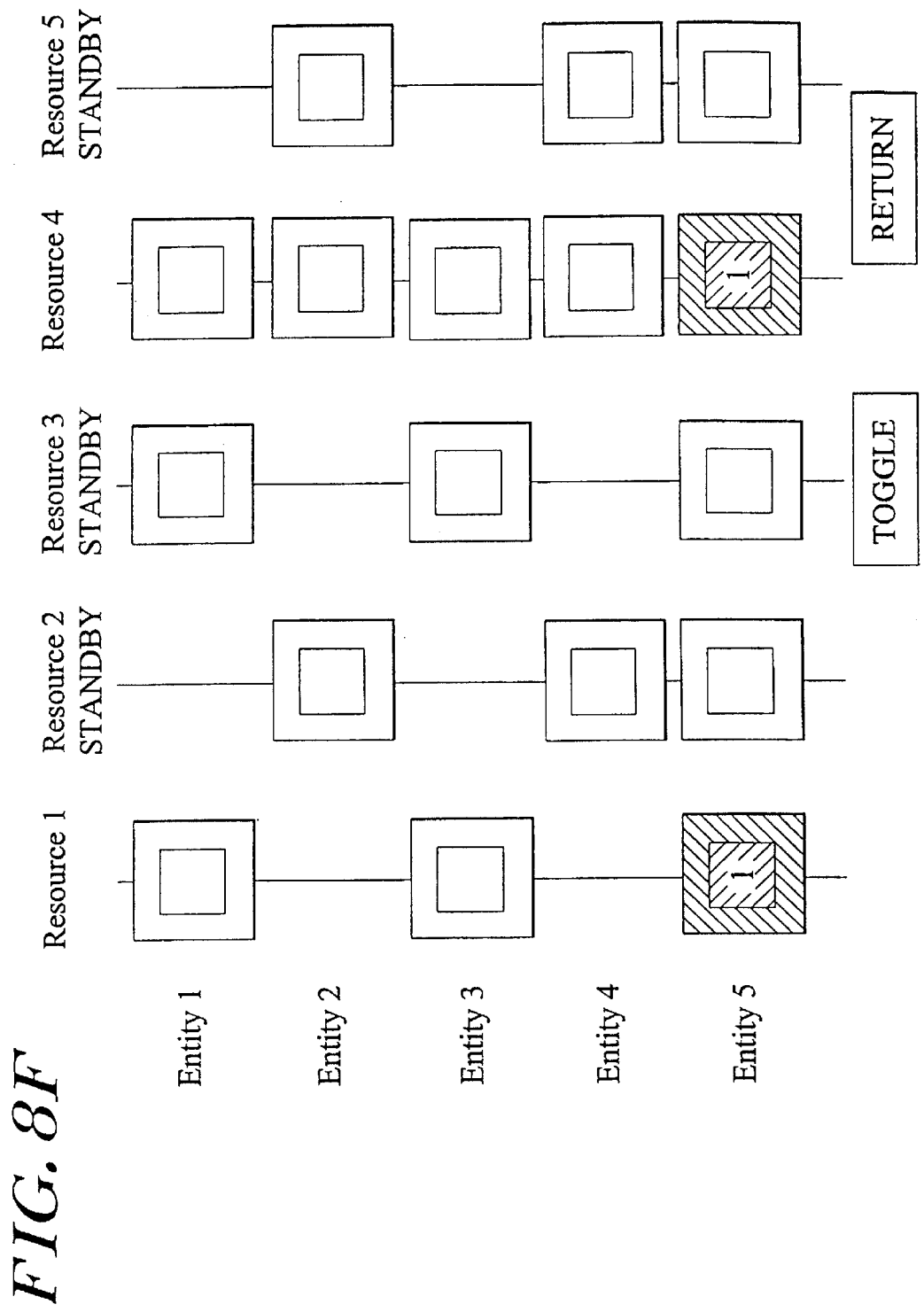

FIG. 8F is an example of a display of the present invention which illustrates the satisfaction of outstanding requests. As shown in FIG. 8F, the outstanding requests by the process entity 5 is now being satisfied as the process resource has been freed from the outstanding booking by process entity 2. All process resource requirements of the process entity 5 are now being satisfied.

Figure 8G:
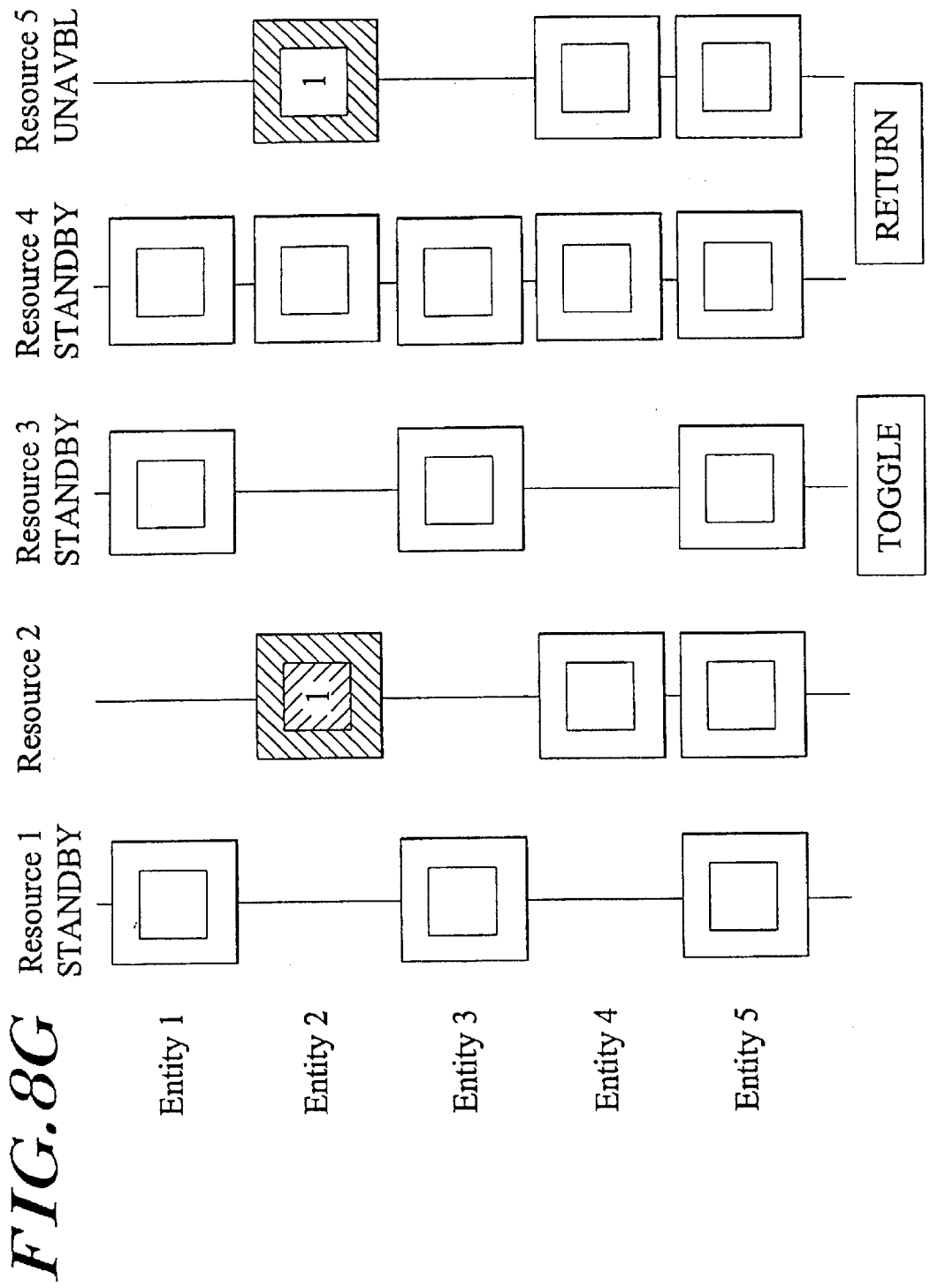

FIG. 8G is an example of another display of the present invention which illustrates the status of an unavailable process resource. As shown in FIG. 8G, process entity 2 requests a booking for process resource 2 and process resource 5. The booking request for the process resource 2 has been granted but the booking request for the process resource 5 has not granted because the process resource 5 is unavailable for booking. This could be due to the equipment failure.

As shown in FIGURES above, the display is dynamic and automatically provides the immediate change of status as it occurs in the plant. The effect of the immediate change is to allow the operator to have instant knowledge of the status of his automatic batch operation and furthermore the ability to use the toggle button and re-arrange the priorities as determined by any immediate needs in the plant.

It is apparent that there has been provided, in accordance with the present invention, a method and system for automated management and the graphical display of booking status information. While this invention has been described in conjunction with illustrative embodiments thereof, it is evident that many alternatives, modifications, and variations will be apparent to those skilled in the art. For example, the present invention can be applied to any type of an overlay booking agent including a matrix type and a non-matrix type. The present invention can also be applied to any shape of indicators including a rectangle, a circle, etc. Accordingly, it is intended to embrace all such alternatives, modifications and variations that fall within the spirit and broad scope of the appended claims.

What is claimed is:

1. A method for displaying the status of a batch processing system, the method comprising:

displaying, in a first dimension, identifiers for different system resources, displaying, in at least one second dimension, identifiers for different system entities that place booking requests for at least one of the different resources, displaying status indicators based on the booking requests from the entities for the resources at the intersections of the resources and the entities, in which each status indicator indicates at least one of: (i) whether an entity has placed a booking request for a resource and (ii) whether a resource has been provided to an entity based on a booking request, and, displaying at least one priority designation indicating the priority of at least one of the booking requests for at least one of the resources, where each booking request is fulfilled, such that each different resource that is requested by a requesting entity is provided to the requesting entity, and such that each resource that is requested by different requesting entities is provided to each requesting entity in an order that is based on the priority of the booking requests associated with each requesting entity.

2. A method according to claim 1, wherein displaying at least one priority designation further includes:

displaying the at least one priority designation with at least one of the status indicators.

3. A method according to claim 1, further comprising:

enabling the status indicators to be responsive to at least one of: the status of the resources and the status of the booking requests for the resources.

4. A method according to claim 1, further comprising:

changing the status indicators based on at least one of: a change in the status of the resources and a change in the status of the booking requests for the resources.

5. A method according to claim 1, further comprising:

changing the status indicators based on accepting booking requests for the resources.

6. A method according to claim 1, further comprising:

changing at least one of the status indicators based on a received instruction specifying the at least one status indicator.

7. A method according to claim 1, wherein displaying at least one priority designation further includes:

assigning the at least one priority designation based on other booking requests for the at least one resource.

8. A method according to claim 1, further comprising:

selecting at least one of the status indicators to display the priority of at least one pending booking request relative to pending booking requests by other entities for the same at least one resource.

9. A method according to claim 1, further comprising:

updating the at least one priority designation based on updated status information for the at least one resource.

10. A method according to claim 1, wherein displaying in a first dimension and displaying in at least one second dimension further comprises:

generating a two-dimensional matrix having a first axis representing the entities and a distinct second axis representing the resources.

11. A method according to claim 1, further including:

associating availability indicators with the resources, the availability indicators including at least one of a standby indicator, an unavailable indicator, and a busy indicator, and, displaying the availability indicators to associate the availability indicators with the resources.

12. A method according to claim 11, wherein displaying the availability indicators further includes:

generating the availability indicators for display with the identifiers for the resources.

13. A method according to claim 1, wherein displaying at least one priority designation further includes:

displaying alphanumeric characters.

14. A method for displaying booking status between process entities and process resources, the method comprising:

displaying a matrix including at least two dimensions, the matrix having a first axis representing different entities and a distinct second axis representing different resources, displaying status indicators at the matrix intersections to correlate the resources to the respective entities that may book requests for the resources, in which each status indicator indicates at least one of: (i) whether an entity has placed a booking request for a resource and (ii) whether a resource has been provided to an entity based on a booking request, and displaying at least one priority designation indicating the priority of at least one of the booking requests for at least one of the resources, where each booking request is fulfilled, such that each different resource that is requested by a requesting entity is provided to the requesting entity, and such that each resource that is requested by different requesting entities is provided to each requesting entity in an order that is based on the priority of the booking requests associated with each requesting entity.

15. A method according to claim 14, further comprising: responding to the availability of one of the resources for operation with one of the entities by displaying an availability indication in the matrix in association with the one resource and the one entity.

16. A method according to claim 14, further comprising: associating availability indicators with the resources, the availability indicators including one of a standby indicator, an unavailable indicator, and a busy indicator, and, displaying the availability indicators to associate the availability indicators with the resources.

17. A method according to claim 14, further comprising: selecting one of a request active indication and a no-request indication for the entities.

18. A method according to claim 14, further comprising: selecting the status indicators to represent pending booking requests and availability of the resources.

19. A method according to claim 14, further including: selecting the status indicators to represent pending booking requests and availability of the resources concurrently.

20. An apparatus for displaying a multi-function matrix indicator on a visible matrix display, the apparatus comprising:
an indicator generator responsive to first and second report signals of row information and column information, respectively, and capable of producing indicator signals for displaying, at a matrix intersection on the display, a composite indicator having first and second non-alphanumeric graphical indicator portions that have visible parameters responsive to a different one of the first and second report signals, wherein the indicator generator is responsive to a third report signal that is independent of the first and second report signals, to produce further indicator signals for displaying the composite indicator with a third indicator portion responsive to the third report signal.

21. An apparatus according to claim 20, wherein the indicator generator produces the indicator signals for displaying the composite indicator with contiguous first and second indicator portions.

22. An apparatus according to claim 20, wherein the indicator generator produces the indicator signals with one indicator portion disposed as a border peripherally enclosing another indicator portion.

23. An apparatus according to claim 20, wherein the third indicator portion includes an alphanumeric character.

24. An apparatus according to claim 20, wherein the indicator generator produces the third indicator portion superimposed on another of the indicator portions.

25. An apparatus providing an operator interface and management information in a batch processing system having process resources for operating in response to requests by process entities, the apparatus comprising:
a computer for the graphical display of status information regarding the resources operating in response to requests by the entities, the computer including:
a means for generating identifiers for at least one resource and entities that can operate with the at least one resource, and
a means for generating status indicators responsive to the status of booking requests from the entities for the at least one resource, the status indicators having two non-alphanumeric graphical indicator portions responsive to a different one of the at least one resource and the entities, with one indicator portion disposed as a border peripherally enclosing another indicator portion, the means for generating status indicators also including a means for generating priority indicators to display information based on the priority of booking requests for one of the at least one resource relative to other requests for the same one of the at least one resource.

26. An apparatus according to claim 25, wherein the identifier generator includes means for generating an availability indicator for displaying at least one of a standby indication, an unavailable indication, and a busy indication.

27. An apparatus according to claim 25, wherein the means for generating the status indicators includes means for generating status indicators to display both the status of booking requests and the status of resource availability.

28. An apparatus according to claim 25, wherein the computer comprises means for inputting instructions specifying a displayed status indicator and changing that displayed status indicator correspondingly.

29. A method for displaying booking status between process entities and process resources, the method comprising:
displaying a two-dimensional matrix, one axis of which represents different process entities, and the other axis of which represents different process resources,
displaying, at a matrix intersection associated with one process entity and one process resource, a status indicator responsive to at least one of the status of the one process entity and the status of the one process resource, in which the status indicator indicates at least one of: (i) whether the one process entity has placed a booking request for the one process resource and (ii) whether the one process resource has been provided to the one process entity based on the booking request, and,
displaying, with the status indicator, a priority of the request from the one process entity based on pending requests for the one resource from other process entities,
where each booking request is fulfilled, such that each different resource that is requested by a requesting entity is provided to the requesting entity, and such that each resource that is requested by different requesting entities is provided to each requesting entity in an order that is based on the priority of the booking requests associated with each requesting entity.

30. A method according to claim 29, further comprising: responding to the availability of one of the resources for operation with one of the process entities and displaying an availability indication in the matrix to associate the one process resource and the one process entity.

31. A method according to claim 29, further comprising: selecting, for at least one indicator of resource status, from a standby indication, an unavailable indication, and a busy indication.

32. A method according to claim 29, further comprising: selecting, for at least one indicator of entity status, from a request active indication and a no-request indication.

33. A method according to claim 29, further comprising: selecting status indicators to display the status of pending entity requests and the status of resource availability.

34. A method according to claim 29, further comprising: selecting status indicators to display entity request and resource availability statuses concurrently.

* * * * *

UNITED STATES PATENT AND TRADEMARK OFFICE
CERTIFICATE OF CORRECTION

PATENT NO. : 6,806,891 B1
DATED : April 28, 2005
INVENTOR(S) : Manuel et al.

It is certified that error appears in the above-identified patent and that said Letters Patent is hereby corrected as shown below:

<u>Title page,</u>
Item [22], Filing Date, please change "Apr. 29, 2000" to -- Apr. 28, 2000 --

Signed and Sealed this

Fifth Day of July, 2005

JON W. DUDAS
*Director of the United States Patent and Trademark Office*